(12) United States Patent
Dubkov et al.

(10) Patent No.: US 7,797,931 B2
(45) Date of Patent: *Sep. 21, 2010

(54) CATALYST COMPOSITION FOR DIESEL PARTICULATE FILTER

(75) Inventors: Alexei A Dubkov, Aachen (DE); Albert N Chigapov, Aachen (DE); Brendan Patrick Carberry, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 360 days.
This patent is subject to a terminal disclaimer.

(21) Appl. No.: 11/766,397

(22) Filed: Jun. 21, 2007

(65) Prior Publication Data

US 2007/0245724 A1 Oct. 25, 2007

Related U.S. Application Data

(63) Continuation-in-part of application No. 11/385,005, filed on Mar. 20, 2006.

(30) Foreign Application Priority Data

Jun. 22, 2006 (EP) .................................. 06115850

(51) Int. Cl.
*F01N 3/10* (2006.01)
*F01N 3/021* (2006.01)
*B01J 23/40* (2006.01)
*B01J 21/00* (2006.01)
*B01J 8/02* (2006.01)

(52) U.S. Cl. ................... 60/299; 423/213.5; 423/245.3; 502/258; 502/260; 502/303

(58) Field of Classification Search .................... 60/289, 60/299; 423/213, 212, 213.2, 213.5, 213.7, 423/230, 245.1, 245.3, 246, 247, 215.15; 502/60, 64, 66, 73, 100, 300, 302, 303, 325, 502/326, 330, 331, 332, 333, 334, 339, 406, 502/258, 268

See application file for complete search history.

(56) References Cited

U.S. PATENT DOCUMENTS 3,899,444 A * 8/1975 Stephens .................... 502/241
4,711,870 A * 12/1987 Yamada et al. .............. 502/303
4,759,918 A 7/1988 Homeier et al.

(Continued)

FOREIGN PATENT DOCUMENTS

EP 0160482 A2 11/1985

(Continued)

OTHER PUBLICATIONS

Wu, Y. et al. "The role of redox property of La2-x(Sr, Th)x CuO4±λ playing in the reaction of NO decomposition and NO reduction by CO", Journal of Molecular Catalysis A:Chemical 155 (2000) pp. 89-100.

(Continued)

*Primary Examiner*—Wayne Langel
*Assistant Examiner*—Syed Iqbal
(74) *Attorney, Agent, or Firm*—Dinsmore & Shohl LLP

(57) ABSTRACT

A catalyst composition is provided for use on a diesel particulate filter which facilitates the oxidation of soot from diesel engine exhaust and which generates low $NO_2$ emissions during regeneration of the filter. The catalyst composition includes a catalytic metal comprising a platinum group metal selected from Pt, Pd, Pt—Pd, or combinations thereof, an active metal oxide component containing Cu and La; and an oxide component selected from oxides of Co, Fe, or combinations thereof. The catalyst composition includes a support selected from alumina, silica, zirconia, or combinations thereof. The catalyst composition may be provided on a diesel particulate filter by impregnating the filter with an alumina, silica or zirconia sol solution modified with glycerol and/or saccharose, impregnating the filter with a stabilizing solution, and impregnating the filter with a solution containing the catalyst metal precursor(s), the active metal oxide precursor(s) and the Co or Fe oxide(s). The resulting catalyst coated diesel particulate filter provides effective soot oxidation, exhibits good thermal stability, has a high BET surface area, exhibits minimal backpressure, and produces low $NO_2$ emissions during filter regeneration.

17 Claims, 4 Drawing Sheets

U.S. PATENT DOCUMENTS

| | | |
|---|---|---|
| 4,900,517 A | 2/1990 | Domesle et al. |
| 5,075,274 A | 12/1991 | Kiyohide et al. |
| 5,100,632 A | 3/1992 | Dettling et al. |
| 5,330,945 A | 7/1994 | Beckmeyer et al. |
| 5,610,117 A | 3/1997 | Horiuchi et al. |
| 5,746,989 A | 5/1998 | Murachi et al. |
| 5,911,961 A | 6/1999 | Horiuchi et al. |
| 6,143,691 A | 11/2000 | Shiraishi et al. |
| 6,166,283 A * | 12/2000 | Bharadwaj et al. .......... 585/658 |
| 6,248,689 B1 | 6/2001 | Manson |
| 6,764,664 B2 | 7/2004 | Zhang |
| 6,855,661 B2 | 2/2005 | Kim |
| 2004/0018939 A1 | 1/2004 | Chigapov et al. |
| 2005/0207956 A1 * | 9/2005 | Vierheilig ................ 423/213.2 |

FOREIGN PATENT DOCUMENTS

| | | |
|---|---|---|
| EP | 0164881 A1 | 12/1985 |
| EP | 0658369 A2 | 6/1995 |
| EP | 0758713 A1 | 2/1997 |
| EP | 1055805 A1 | 11/2000 |
| EP | 1295637 A1 | 3/2003 |
| EP | 1356864 A1 | 10/2003 |
| EP | 1398069 A2 | 3/2004 |
| WO | WO 9416817 A1 | 8/1994 |
| WO | WO 0029726 A1 | 5/2000 |
| WO | WO 0112320 A1 | 2/2001 |
| WO | WO 2005051523 A1 | 6/2005 |

OTHER PUBLICATIONS

Peter, S.D. et al., "Catalytic properties of La2CuO4 in the CO+NO reaction" Catalysis Letters, vol. 54, Nos. 1-2 (1998) pp. 79-84.

S-Petersburg Nauka "Handbook of status diagrams for systems for hardly melting metals" (Science) 1997, pp. 58-65.

* cited by examiner

CATALYST COMPOSITION FOR DIESEL PARTICULATE FILTER

CROSS-REFERENCE TO RELATED APPLICATIONS

This application is a continuation-in-part of U.S. application Ser. No. 11/385,005 filed Mar. 20, 2006, entitled SOOT OXIDATION CATALYST AND METHOD OF MAKING. The entire contents of said application are hereby incorporated by reference.

BACKGROUND OF THE INVENTION

The present invention relates to a catalyst composition for use on a diesel particulate filter, and more particularly, to a catalyst composition which effectively facilitates the oxidation of soot without generating increased $NO_2$ emissions during regeneration of the filter.

In recent years, environmental regulations in the United States and Europe restricting diesel particulate emissions have necessitated improvements in the removal of particulates from diesel engine emissions. Such particulates generally consist of carbonaceous particulates in the form of soot. Currently, the most commonly used method for removing soot from engine exhaust is the use of a diesel particulate filter ("DPF") which collects the soot, followed by oxidation of the accumulated particulates at elevated temperatures which regenerates the filter.

However, a problem which occurs during DPF regeneration is the increase in nitrogen dioxide ($NO_2$) emissions. While the specific emission of $NO_2$ during regeneration is not currently regulated by legislation, such $NO_2$ emissions are still a health concern as such emissions can be harmful to the lungs. For example, if DPF regeneration is carried out in an enclosed area such as a garage, a huge increase of pollutants may occur in the air surrounding the vehicle. In some instances, these increased emissions may lead to high pollutant concentrations which exceed occupational health standards.

The problem of increased $NO_2$ production during the particulate filter regeneration process is related to the mechanism of soot combustion in the particulate filters. Several different methods of regenerating particulate filters are known. One method uses a non-catalyzed diesel particulate filter. A problem with the use of such non-catalyzed diesel particulate filters is that regeneration of the filter by soot oxidation can be difficult due to the low temperatures of diesel exhaust gases (e.g., less than about 200° C.), which are unfavorable for soot oxidation. Accordingly, it is necessary to use periodic high-temperature regeneration of the filter to oxidize the soot at elevated temperatures.

Another known particulate filter system relies on fuel-borne catalytic assistance in the regeneration of the DPF, i.e., the inclusion of a catalyst, typically metal, in the fuel as an additive which functions to lower the temperature at which carbon combusts. However, such a system is complex and requires additional components such as a tank for fuel additives, an additive dosing system, and infrastructure to refill the additive fuel tank. In addition, the use of fuel-borne catalysts can lead to the formation of ash which accumulates on the filter, causing gradual loss of filter soot capacity and a decrease in time between regeneration events. Therefore, it is necessary to change the filter after about every 80 K kilometers.

Another known method for removing soot is to deposit a catalyst on the walls of the DPF, also referred to as a "catalyzed DPF" or "CDPF." A catalyzed soot filter typically comprises one or more platinum group metal catalysts and/or a palladium containing oxidation catalyst to improve soot oxidation on the filter. The use of catalyzed diesel particulate filters are generally preferred for use in soot oxidation during regeneration due to the fact that they are less complex than fuel-assisted diesel particulate filters, and achieve effective soot oxidation at lower temperatures relative to non-catalyzed, uncoated filters. However, such catalyzed soot filters are typically expensive to produce due to the high cost of platinum group metals.

In addition, the amount of $NO_2$ emissions generated from these known methods of diesel particulate filter regeneration varies. Typically, regeneration methods which utilize non-catalyzed diesel particulate filters and fuel-borne catalyst assisted particulate filters demonstrate a low $NO_2$ production ratio (i.e., the amount of $NO_2$ at the inlet of the filter is higher than the $NO_2$ emissions at the outlet). The exhaust gas downstream of the non-catalyzed or fuel-borne catalyst assisted diesel particulate filter has a lower $NO_2$ concentration in comparison with the inlet concentration due to the reaction of $NO_2$ with soot during regeneration:

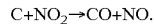

$$C+NO_2 \rightarrow CO+NO.$$

On the other hand, conventional catalyzed diesel particulate filters which use platinum-based catalysts show a high $NO_2$ production ratio, i.e., the amount of $NO_2$ on the filter outlet is higher than the $NO_2$ upstream of the filter inlet, indicating an increase in the production of $NO_2$ during regeneration.

As the use of catalyzed diesel particulate filters are generally preferred for use in soot oxidation, it would be desirable to be able to decrease $NO_2$ emissions generated during filter regeneration to the low level achieved with other types of filters while still maintaining the soot combustion properties. It would also be desirable to eliminate all or part of the platinum group metals used in such filters.

While attempts have been made to suppress or reduce the amount of $NO_2$ emissions in diesel particulate filters in general (i.e., with the use of a reduction catalyst such as urea, fuel, or hydrocarbons placed in the exhaust gas flow path), no solution has been developed for decreasing $NO_2$ emissions during regeneration without the use of a reduction catalyst.

Accordingly, there is still a need in the art for a catalyst composition for use in a diesel particulate filter which can effectively oxidize soot during periodic high temperature regenerations, which uses little or no platinum, and which effectively decreases $NO_2$ emissions produced during such regenerations without the need for a reductant or other additional equipment.

SUMMARY OF THE INVENTION

The present invention meets those needs by providing a catalyst composition for use in a diesel particulate filter which uses little or no platinum, which effectively oxidizes soot, and which results in low $NO_2$ emission production during regeneration.

According to one aspect of the present invention, a catalyst composition is provided for use on a diesel particulate filter for facilitating soot oxidation which comprises a catalytic metal comprising a platinum group metal selected from Pt, Pd, Pt—Pd, or combinations thereof; an active metal oxide component containing Cu and La; and an oxide selected from oxides of Co, Fe, or combinations thereof.

The platinum group metal (PGM) loading in the composition is less than about 20 g/ft³. More preferably, the PGM loading is between about 5 to about 15 g/ft$^3$. In one embodiment of the invention, the platinum group metal may comprise palladium only.

The active metal oxide component may comprise CuO—La$_2$CuO$_4$, which provides good soot oxidation properties to the catalyst composition. The preferred loading for CuO is about 3.6 to about 12.6 g per filter (5.66"×6" size), and for La$_2$O$_3$, about 4.7 g to about 17.2 g.

Further, the composition may comprise cobalt and/or iron oxides to decrease NO$_2$ emissions. The preferred loading for Co$_3$O$_4$ is about 2.4 g to about 5.1 g, and for Fe$_2$O$_3$, about 1.5 g to about 2.5 g.

The catalyst composition may further include a support selected from alumina, silica, zirconia, and combinations thereof. The support material is preferably stabilized with lanthanum, zirconium, aluminum, or combinations thereof. By "stabilized," it is meant that the support material is prevented from sintering at high temperatures, i.e., temperatures greater than about 1000 to 1200° C., which may be encountered during regeneration of a diesel particulate filter.

The catalyst composition of the present invention may be provided on a diesel particulate filter or other porous substrate for providing oxidation of soot accumulated on the filter. In a preferred method of providing the catalyst on the filter, a diesel particulate filter is first impregnated with a colloidal solution selected from alumina sol, silica sol, zirconia sol, or combinations thereof, which, when dried, forms a support material for the catalyst. The colloidal solution may further include an organic compound selected from saccharose, glycerol, and combinations thereof. Such organic compounds function to increase the surface area of the coating. After coating the filter with the colloidal solution, the impregnated filter is then dried and calcined.

The filter is then impregnated with a stabilizing solution to prevent sintering of the support during regeneration. Where the colloidal solution comprises an alumina sol, the stabilizing solution comprises zirconyl acetate, lanthanum nitrate, or a combination thereof. Where the colloidal solution comprises silica sol, the stabilizing solution comprises zirconyl acetate, aluminum nitrate, or a combination thereof. Where the colloidal solution comprises zirconia sol, the stabilizing solution comprises lanthanum nitrate. After impregnation with the stabilizing solution, the coated filter is again dried and calcined.

Next, the filter is impregnated with a solution containing a catalytic metal precursor selected from silver nitrate, palladium nitrate, dihydrogen hexachloroplatinate, and combinations thereof, a metal oxide precursor selected from copper nitrate, lanthanum nitrate, and mixtures thereof, and an oxide component selected from cobalt nitrate, iron (III) nitrate, and combinations thereof. The impregnated filter is then dried and calcined.

Where the diesel particulate filter has been coated with a composition which includes a colloidal solution comprising alumina sol or silica sol, the coated filter preferably has a BET surface area of at least 30-40 m$^2$/g. Where the filter has been coated with a composition containing a zirconia sol, the coated filter preferably has a BET surface area of at least 9-12 m$^2$/g.

The present invention also provides a diesel exhaust gas treatment system comprising a diesel particulate filter for receiving diesel exhaust gas from a diesel engine and a catalyst composition impregnated in the filter, where the catalyst composition comprises a catalytic metal comprising a platinum group metal selected from Pt, Pd, Pt—Pd, or combinations thereof; an active metal oxide component containing Cu and La; and an oxide component selected from oxides of Co, Fe, or combinations thereof. When incorporated in such a diesel exhaust treatment system, the catalyst composition of the present invention is capable of oxidizing soot at a temperature of between about 550° C. and 600° C. In addition, the catalyst composition facilitates low NO$_2$ emissions during filter regeneration such that the amount of NO$_2$ is reduced to between about 0.40 to 0.70 of its initial level upstream of the filter. More preferably, the amount of NO$_2$ is reduced to about 0.60, and most preferably, about 0.40. This value is represented by the amount of NO$_2$ on the DPF outlet (g/s) divided by the amount of NO$_2$ on the DPF inlet (g/s).

Accordingly, it is a feature of the present invention to provide a catalyst composition having little or no platinum metal loading which provides effective oxidation of soot and which produces low NO$_2$ emissions during regeneration of the particulate filter. Other features and advantages will be apparent from the following description, the accompanying drawings, and the appended claims.

DETAILED DESCRIPTION OF THE PREFERRED EMBODIMENTS

Figure 1:
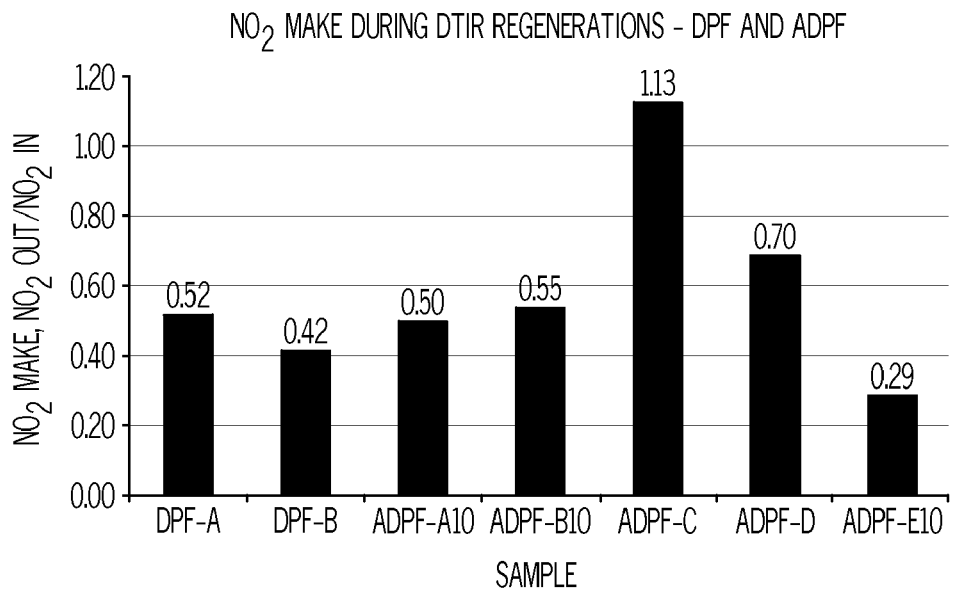
FIG. 1 is a graph illustrating NO$_2$ emissions during regeneration of non-catalyzed and fuel-assisted diesel particulate filters.

We have found that combining the catalytic metals Pt and/or Pd with a metal oxide component CuO—La$_2$CuO$_4$ for use as a catalyst in soot oxidation decreases the temperature necessary for soot oxidation while permitting decreased loading of costly Pt and Pd group metals. We have also found that the further addition of cobalt and/or iron oxides to the catalyst composition provides a lower level of NO$_2$ emissions during filter regeneration. While not wishing to be bound to any theory, we believe the addition of cobalt and/or iron oxide in combination with the metal oxide component CuO—La$_2$CuO$_4$ produces a thermally stable perovskite-like structure for the catalyst. The catalyst composition of the present invention results in NO$_2$ emissions which are as low or lower than the emissions achieved with non-catalyzed or fuel-assisted DPFs.

In addition, when coated onto a diesel particulate filter, the catalyst composition provides good thermal stability, minimal backpressure, and high surface area. By "thermal stability" it is meant that the catalyst maintains its activity or oxidation performance even after exposure to high temperatures. By "backpressure," it is meant the resistance to flow which is caused when the filter pores become blocked or are decreased in size, e.g., from the accumulation of soot or the coating of the catalyst onto the filter. By "minimal backpressure" it is meant that, when coated onto the filter, the catalyst of the present invention increases the backpressure of the filter only slightly.

Preferred catalytic metals for use in the catalyst composition include Pt, Pd, Pt—Pd, or combinations thereof. The preferred metal oxide component has a Cu/La ratio of 1:1 and preferably comprises $CuO-La_2CuO_4$. The preferred cobalt and iron oxides are $Co_3O_4$ and $Fe_2O_3$. The preferred loadings for the oxide components are as follows: for CuO, about 3.6 to about 12.6 g; for $La_2O_3$, about 4.7 g to about 17.2 g; for $Co_3O_4$, about 2.4 g to about 5.1 g; and for $Fe_2O_3$, about 1.5 g to about 2.5 g.

The catalyst composition of the present invention is preferably supported on a refractory oxide to increase its surface area, and consequently, increase its activity in soot oxidation. The refractory oxide support also functions to increase the thermal stability of the catalyst to high temperatures encountered in diesel particulate filter applications. Preferred refractory oxides for use in the present invention include alumina, silica, and zirconia.

Such refractory oxides are preferably deposited on a diesel particulate filter by impregnating the filter with a colloidal solution selected from alumina sol, silica sol, zirconia sol, or combinations thereof. We have found that impregnating diesel particulate filters with such a sol solution avoids blocking the pores of the filter (monolith), resulting in minimal backpressure. While coating with a slurry has been commonly used for coating of filters (monoliths) with catalysts such as 3-way catalysts, a slurry is not feasible for coating on a diesel particulate filter as the average pore diameter of a silicon carbide (SiC) substrate material is about 9 microns. Coating such a substrate material with a slurry would block the pores or significantly decrease their diameter because the size of particles in such a slurry is comparable or higher than the size of the pores in the filter.

While sols have been used for monolith coatings in automotive catalysis, typically only about 5 wt. % sol has been used for the purpose allowing larger slurry particles to adhere to the surface. However, we have found that the sol solution itself can provide good high surface area coating of the catalyst on porous filter materials such as diesel particulate filters.

The average particle size of the sols is preferably 0.004 to 0.01 microns for silica sol, 0.05 microns for alumina sol, and 0.005-0.001 microns for zirconia sol. Preferred sols for use in the present invention are commercially available from Alfa Aesar. The amount of sol used will vary depending on the porosity of the substrate material. Typically, about 520-550 ml of sol is used for a standard filter size of 5.66 inches×6 inches having a porosity of 65% (made from cordierite) while about 350 ml of sol is used for silicon carbide filters having a porosity of 42%.

We have found that in a typical porous filter material (diesel particulate filter made from cordierite or SiC), after absorption of 300 to 550 ml of solution (5.66"×6" filter), the BET surface area is about 24-30 $m^2/g$ after one coating with 20% alumina sol or 30% silica sol. It is preferred that the particle size of the sol solutions be at least 2 orders lower than the filter pore size to avoid blocking of the pores.

We have additionally found that the surface area of the catalyst coating is significantly improved by adding organic compounds such as saccharose and glycerol to the sol solution (see Table 2). Such organic compounds also prevent the increase in size of primary particles in the alumina, zirconia or silica sols. Saccharose functions as a templating agent, while glycerol functions to prevent the sticking of primary particles. Both compounds additionally decrease the crystallization of aluminum and the collapse of the monolith structure during the drying step. It should be noted that pure sugar may be used instead of saccharose with the same results. Preferably, 5-10 g of saccharose and 10-30 ml of glycerol are added to 1 L of sol solution. While higher concentrations will further increase the surface area, we have found that such higher concentrations also increase the solution viscosity, which is undesirable for coating purposes.

After application of the sol on the filter by impregnation, the filter is preferably dried at a temperature of about 77 to 100° C. and calcined at a temperature of about 285° C. for about 1 hour to form the support for the catalyst.

In order to maintain the surface area of the sol coating and to prevent sintering of the support at high temperatures (e.g., regeneration temperatures up to 1200° C.), it is preferable to stabilize the alumina, silica, or zirconia support material after it is coated onto the monolith and dried/calcined. Where the support comprises alumina, the alumina is stabilized by impregnation with zirconium and/or lanthanum precursors, preferably zirconyl acetate and lanthanum nitrate. Preferably, 10-15% Zr (mol % to Al) and 3-5 La (mol % to Al) is used. Where the support comprises silica, a solution of zirconyl acetate is preferred for stabilization. Preferably, 10-20% Zr (mol % to Si) is used. In addition, up to about 5 mol % aluminum (aluminum nitrate) may be added to further increase the thermal stability of the support. Where the support comprises zirconia, a lanthanum solution is used. Preferably, 3-5% La (mol % to Zr) is used. After application of the stabilizing solution, the coated filter is again dried at about 77 to 100° C. and calcined at about 800° C. for about 2 hours.

After stabilization, the filter is then impregnated with a washcoat solution containing the catalytic metal precursor selected from silver nitrate, palladium nitrate, and dihydrogen hexachloroplatinate, and combinations thereof, the active metal oxide precursor selected from copper nitrate, lanthanum nitrate, and mixtures thereof, and an oxide precursor component selected from cobalt nitrate, iron (III) nitrate, and combinations thereof.

The catalyst washcoat solution preferably further includes a small amount of citric acid, preferably about 35-40 g per filter, which aids in providing a homogeneous deposition of the catalyst on the filter.

The washcoat solution may also include one or more nitrates selected from yttrium nitrate, magnesium nitrate, and cerium nitrate. These nitrates are preferably added in small amounts of about 1-4 g to further stabilize the support and/or the catalyst against sintering.

After impregnation of the catalyst washcoat, the coated filter is preferably calcined at about 750° C. for about 16 hours.

Thus, the catalyst composition of the present invention may be provided on a diesel particulate filter in a three-step process in which the filter is 1) impregnated with a colloidal solution, 2) impregnated with a stabilizing solution, and 3) impregnated with a catalyst washcoat. While the catalyst composition is described herein as being coated onto a diesel particulate filter, it should be appreciated that the composition may also be provided on other porous substrates such as mullite, aluminum titanate, alumina, etc. The catalyst composition is preferably coated onto a diesel particulate filter comprised of porous cordierite or silicon carbide (SiC).

Where the diesel particulate filter is comprised of SiC, the catalyst-coated filter preferably has a BET surface area of at least 30-40 $m^2/g$ where the support material comprises alumina or silica. Where the support material comprises zirconia, the BET surface area is about 9-12 $m^2/g$.

The diesel particulate filter including the catalyst composition therein may be used in a diesel exhaust gas treatment system to provide effective soot oxidation. The catalyst composition preferably provides from about 60 to 100% soot oxidation at a targeted temperature of regeneration between about 550 and 600° C., and more preferably, provides about 80 to 100% soot oxidation.

During regeneration, additional fuel is typically injected into the engine, and a diesel oxidation catalyst positioned upstream from the diesel particulate filter combusts the additional fuel, resulting in the release of heat. This heat increases the temperature of the diesel particulate filter up to about 600° C., which is sufficient to oxidize any accumulated soot on the filter. The amount of $NO_2$ emissions produced during regeneration is between about 0.40 to 0.70, more preferably, about 0.60, and most preferably, about 0.40.

While the invention has been described primarily with regard to the removal of soot from diesel engines, it should also be appreciated that the catalyst composition may also be used in coal combustion applications.

In order that the invention may be more readily understood, reference is made to the following examples which are intended to illustrate the invention, but not limit the scope thereof.

EXAMPLE 1

Preparation of Catalyzed Diesel Particulate Filters

A number of diesel particulate filters were prepared using the catalyst composition in accordance with the present invention. Sample #55 is a comparative sample which was prepared without the use of Co and/or Fe oxides.

Sample Filter #32

A cordierite filter (mass m=1048 g) was impregnated with a solution containing 250 m of zirconyl acetate; 30 ml glycerol, 17 g saccharose, 5 g lanthanum acetate, and distilled water to a total volume of 550 ml to form a La-stabilized zirconia washcoat. The sample was dried at 117° C. and calcined at 750° C. for 3 hours. The diesel particulate filter was then impregnated with a solution containing dihydrogen hexachloroplatinate, copper nitrate, lanthanum nitrate, iron (III) nitrate, cobalt nitrate and cerium (III) nitrate. The Pt loading was 1.76 g (corresponding to a concentration of 20 g/ft$^3$), CuO loading was 17.5 g; $La_2O_3$ loading was 34.9 g, $Fe_2O_3$ loading was 22.0 g, $Co_3O_4$ loading was 12.4 g, $CeO_2$ loading was 8.0 g. The catalyzed diesel particulate filter was dried at 100° C. and calcined at 750° C. for 16 hours. The final weight of the filter was 1301 g.

Sample Filter #55

A SiC filter (m=1921 g) was impregnated with 10% alumina sol modified with 10 ml of glycerol and 2.7 g of saccharose. The filter was dried at 100° C. overnight and calcined at 285° C. for 1 hour. The filter was then impregnated with a solution containing lanthanum nitrate (5% mol of alumina weight) and zirconyl acetate (15% mol of alumina weight) followed by drying at 100° C. and calcinations at 800° C. for 2 hours. The filter was then impregnated with a solution containing dihydrogen hexachloroplatinate (IV), copper nitrate, and lanthanum nitrate, along with small amounts of yttrium and magnesium nitrates and citric acid (38 g). Pt loading was 1.32 g (15 g/ft$^3$), CuO loading was 4.4 g, $La_2O_3$ loading was 6.4 g, MgO loading was 1.6 g, and $Y_2O_3$ loading was 1.9 g. The filter was finally calcined at 750° C. for 16 hours. The final weight of the filter was 1995 g.

Sample Filter #56

A SiC filter (m=1919 g) was prepared as with sample #55 except that 8% alumina sol was used, and La and Zr loadings were 3 and 10% mol of alumina weight. A mixed Pt—Pd/CuO—$La_2CuO_4$ catalyst composition was formed from a solution containing palladium nitrate, dihydrogen hexachloroplatinate, copper nitrate, lanthanum nitrate, and a small amount of iron (III) nitrate. Pt loading was 0.44 g (5 g/ft$^3$), Pd loading was 0.88 g (10 g/ft$^3$), CuO loading was 3.6 g, $La_2O_3$ loading was 4.7 g, $Fe_2O_3$ was 1.5 g. The final weight of the filter was 1979 g.

Sample Filter #63

A cordierite filter (m=1665 g) was impregnated with 10% alumina sol (375 ml) modified with 10 ml of glycerol and 2.7 g of saccharose. The filter was dried at 100° C. overnight and calcined at 295° C. for 3 hours. The filter was then impregnated with a solution containing lanthanum nitrate (5% mol of alumina weight) and zirconyl acetate (15% mol of alumina weight) followed by drying at 100° C. and calcinations at 800° C. for 2 hours. The filter was then impregnated with a solution containing palladium nitrate, dihydrogen hexachloroplatinate, copper nitrate, lanthanum nitrate, cobalt nitrate, cerium (III) nitrate, iron (III) nitrate and citric acid (32 g). Pt loading was 0.44 g (5 g/ft$^3$), Pd loading was 0.88 g (10 g/ft$^3$), CuO loading was 7.8 g, $La_2O_3$ loading was 6.0 g, $Fe_2O_3$ was 2.0 g, $Co_3O_4$ loading was 2.4 g, $CeO_2$ loading was 1.1 g. The final weight of the filter was 1741 g after drying at 100° C. and calcinations at 750° C. for 16 hours.

Sample Filter #64

A cordierite filter (m=1663 g) was wash-coated with alumina sol and stabilized with lanthanum oxide and zirconia in the method of sample #63. The filter was then impregnated with a solution containing palladium nitrate, dihydrogen hexachloroplatinate, copper nitrate, lanthanum nitrate, cobalt nitrate, and iron (III) nitrate and citric acid (32 g). Pd loading was 1.23 g (14 g/ft$^3$), Pt loading was 0.09 g (1 g/ft$^3$), CuO loading was 9.4 g, $La_2O_3$ loading was 6.9 g, $Fe_2O_3$ was 2.0 g, $Co_3O_4$ loading was 2.8 g. The final weight of the filter was 1737 g after drying at 100° C. and final calcinations at 750° C. for 16 hours.

Sample Filter #65

A cordierite filter (m=1645 g) was prepared as in sample 63, except that platinum and cerium compounds were not added to the precursor solution. Pd loading was 0.44 g (5 g/ft$^3$), CuO loading was 12.6 g, $La_2O_3$ loading was 17.2 g, $Fe_2O_3$ loading was 2.5 g, $Co_3O_4$ loading was 5.1 g. The final weight of the filter was 1743 g.

EXAMPLE 2

The sample filters produced in accordance with Example 1 were tested in comparison with reference (commercial) samples containing higher Pt loadings, non-catalyzed (uncoated) DPF samples, and fuel-assisted DPFs (ADPFs) on an engine dynamometer with 2.0 L common rail (CR) diesel engine equipped with a commercial diesel oxidation catalyst (DOC) in a close-coupled position to determine the amount of $NO_2$ produced during filter regeneration.

Two different types of regeneration methods were used: drop-to-idle regeneration (DTIR) and steady-state regeneration (SSR). By DTIR, it is meant that after initiation of regeneration determined by decrease of backpressure, the engine was switched to idling conditions, providing low flow through the filter and high oxygen concentration (causing the highest peak temperature during regeneration) to evaluate filter regeneration under severe conditions, i.e., conditions favorable for development of high peak temperatures inside DPF).

By SSR, it is meant that a steady-state temperature of 500° C. is maintained during regeneration. This type of regeneration is typically used to evaluate initial and remaining activity of the catalyst in soot combustion.

In DTIR-type regeneration, oxygen is a basic oxidant for soot, in SSR regeneration, the contribution of $NO_2$-assisted regeneration is significant:

$$C+O_2 \rightarrow CO, CO_2$$

$$C+NO_2 \rightarrow CO+NO$$

The test procedure was as follows: 1) high temperature cleaning of filter at 600-610° C. for 30 minutes with post-injection at a predetermined engine speed/load; 2) pressure drop characterization and filter weighing (with a tolerance of ±0.1 g under warm conditions (about 200° C.); 3) soot loading at a predetermined speed/load to a predetermined loading limit at temperatures between 250 and 280° C.; 4) pressure drop characterization and filter weighing under warm conditions; 5) regeneration using DTIR or SSR regeneration; and 6) pressure drop characterization and filter weighing under warm conditions.

DTIR regeneration was performed as follows: 1) switching to a predetermined engine speed/load and stabilizing the exhaust gas temperature; 2) starting post-injection with an increase in the through-flow parameter from zero to maximum mg/stroke within a predetermined time with a target of reaching a temperature of 610° C.±10° C. at the filter inlet; 3) maintaining a maximum post-injection amount, maintaining a temperature of 610° C.±10° C. at the filter inlet until moment X [where moment X=the first data log point at which the pressure difference across the DPF has remained constant or started to decrease; i.e., (dP(X-n)> . . . dP(X-1)>dP(X)]; 4) at moment X, dropping the engine to idle (mass flow rate about 30 kg/h); cutting post-injection with recording of data at 1 sec. intervals until the temperature downstream of the DPF reaches 200° C.

SSR regeneration was performed as follows: 1) switching to a predetermined engine spead/load and stabilizing the exhaust gas temperature; 2) starting post-injection with an increase in the through-flow parameter from zero to maximum mg/stroke within a predetermined time interval with the target to obtain a predetermined temperature of 500° C. at the filter inlet; 3) maintaining the target temperature during a predetermined time interval; and 4) switching off post-injection and stabilizing the temperature.

$NO_2$ emissions during regeneration were calculated as follows:

$NO_2$ make=Average (average within 1 test) [$NO_2$ on DPF outlet (g/s)/$NO_2$ on DPF inlet (g/s)]Regeneration efficiency was calculated as a percentage of soot combusted within DPF during regeneration to initial soot loading. This amount was determined from weight difference for DPF before and after regeneration. Soot loading (g) was also determined as a weight difference of DPF before and after soot loading.

For each test sample, the regeneration efficiency was evaluated as the average value for all regenerations performed. The diesel particulate filters of the present invention were compared with non-catalyzed (uncoated) DPFs, DPFs using fuel-additive assisted regeneration (ADPF), and catalyzed DPFs (CDPFs) which were commercially available reference DPFs. The sample types and testing data are presented in Tables 1 to 3 below.

TABLE 1

Uncoated (DPF) and fuel-additive assisted (ADPF)

| Sample type | Test cycles | Soot loading |
|---|---|---|
| uncoated SiC DPF (A) | 5 DTIR | 3.4-12.7 g/L |
| uncoated cordierite DPF (B) | 5 DTIR | 2.6-8.1 g/L |
| SiC ADPF (A10) | 12 DTIR | 4.0-17.2 g/L |
| SiC ADPF (B10) | 8 DTIR | 4.8-13.3 g/L |
| SiC ADPF (C) | 6 DTIR | 3.8-14.9 g/L |
| SiC ADPF (D) | 7 DTIR | 4.2-12.2 g/L |
| SiC ADPF (E10) | 7 DTIR | 3.9-13.3 g/L |

TABLE 2

Catalyzed (reference) DPFs (CDPF)

| Sample type | Test cycles | Soot loading |
|---|---|---|
| cordierite Pt CDPF (B) | 5 DTIR | 2.2-8.3 g/L |
| cordierite Pt CDPF (C) | 6 DTIR | 2.6-10.1 g/L |
| cordierite Pt CDPF (D) | 4 DTIR | 2.4-7.2 g/L |
| SiC Pt—Pd (2/1) CDPF (DE) | 3 DTIR | 5.0-9.0 g/L |
| SiC CDPF (D) | 6 DTIR | 2.3-9.6 g/L |
| cordierite Pt CDPF (F) | 4 DTIR | 2.2-7.2 g/L |
| cordierite Pt CDPF (G) | 6 DTIR | 1.1-5.7 g/L |

TABLE 3 catalyzed DPFs (present invention)

| Sample type/No. | Test cycles | Soot loading |
|---|---|---|
| cordierite Pt CDPF (32) | 4 DTIR | 2.2-7.0 g/L |
| SiC Pt CDPF (55) | 4 DTIR | 3.9-10.4 g/L |
| SiC Pt—Pd (1/2) CDPF (56) | 4 DTIR | 5.0-10.9 g/L |
| cordierite Pt—Pd (1/2) CDPF (63) | 5 DTIR | 2.4-8.3 g/L |
| codierite Pt—Pd (1/14) CDPF (64) | 5 DTIR | 2.2-8.7 g/L |
| cordierite Pd CDPF (65) | 5 DTIR | 2.8-8.6 g/L |

FIG. 1 illustrates the test results for uncoated DPFs and fuel-additive assisted (ADPF) filters during regeneration. As can be seen, there is essentially little or no increase in $NO_2$ production during regeneration. The amount of $NO_2$ on the DPF outlet is within a value of 0.40 to 0.70 (with only two exceptions) of the $NO_2$ amount entering the DPF during regeneration, with an average value of about 0.60.

Figure 2:
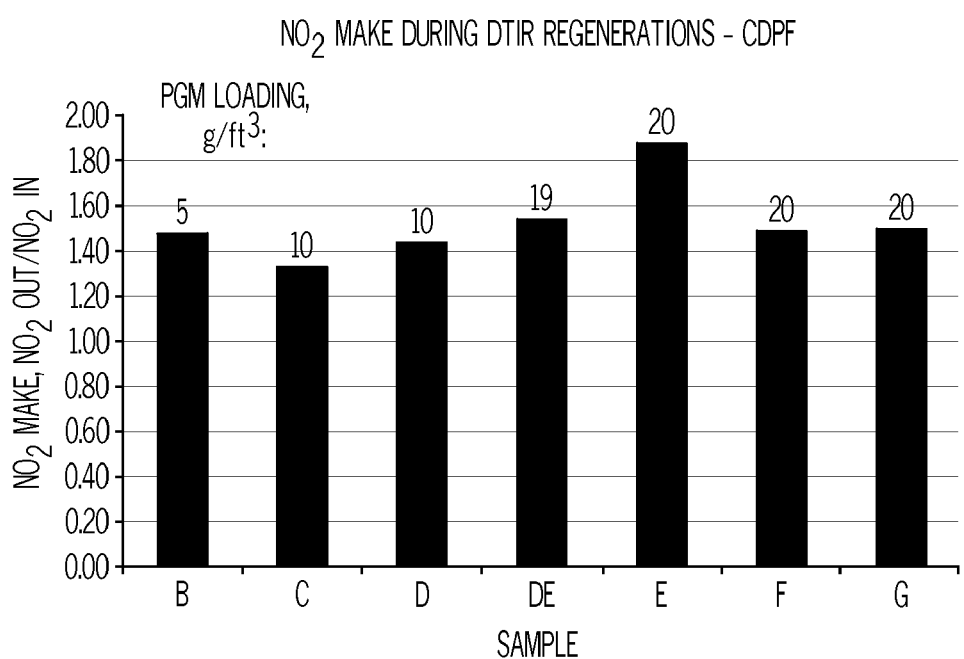
FIG. 2 is a graph illustrating NO$_2$ emissions during regeneration of a reference catalyzed diesel particulate filter.

In contrast, FIG. 2 illustrates that during regeneration of filters using commercially produced catalyzed DPFs, there is a significant increase in $NO_2$ production, i.e., the $NO_2$ content at the filter outlet was about 30 to 90% higher than at the filter inlet. Also as can be seen, the addition of Pd to Pt in the catalyst compositions did not decrease the amount of $NO_2$ emissions.

Figure 3:
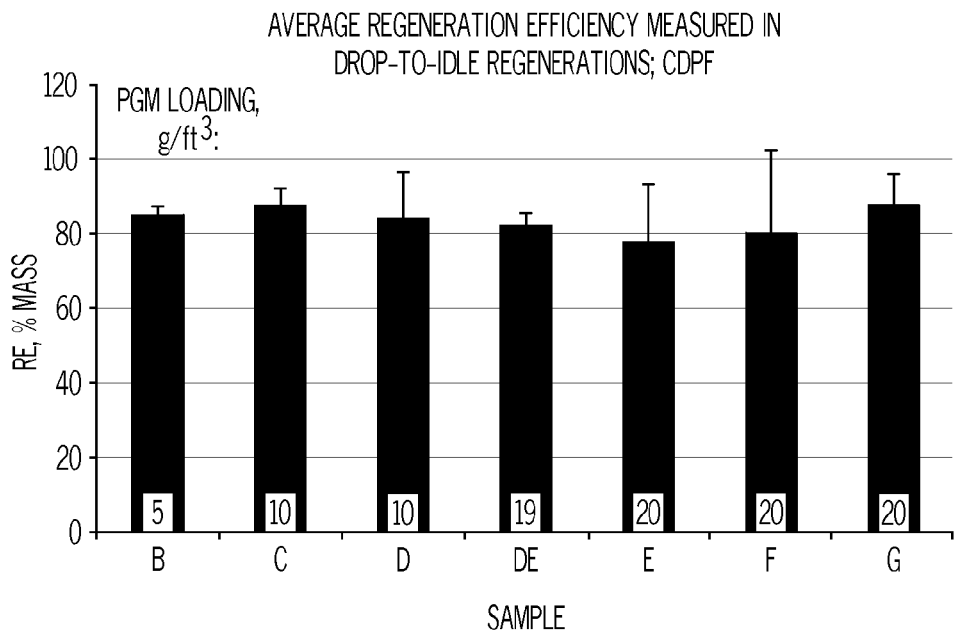
FIG. 3 is a graph illustrating average (DTIR) regeneration efficiency of a reference catalyzed diesel particulate filter.

FIG. 3 illustrates the average regeneration efficiencies for DTIR regenerations for conventionally produced CDPF samples, which is typically between 80 to 90% by mass.

The results shown in FIG. 2 illustrate that $NO_2$ emissions during regeneration of conventional catalyzed DPFs are unacceptable in comparison with non-catalyzed and fuel-assisted DPFs.

Figure 4:
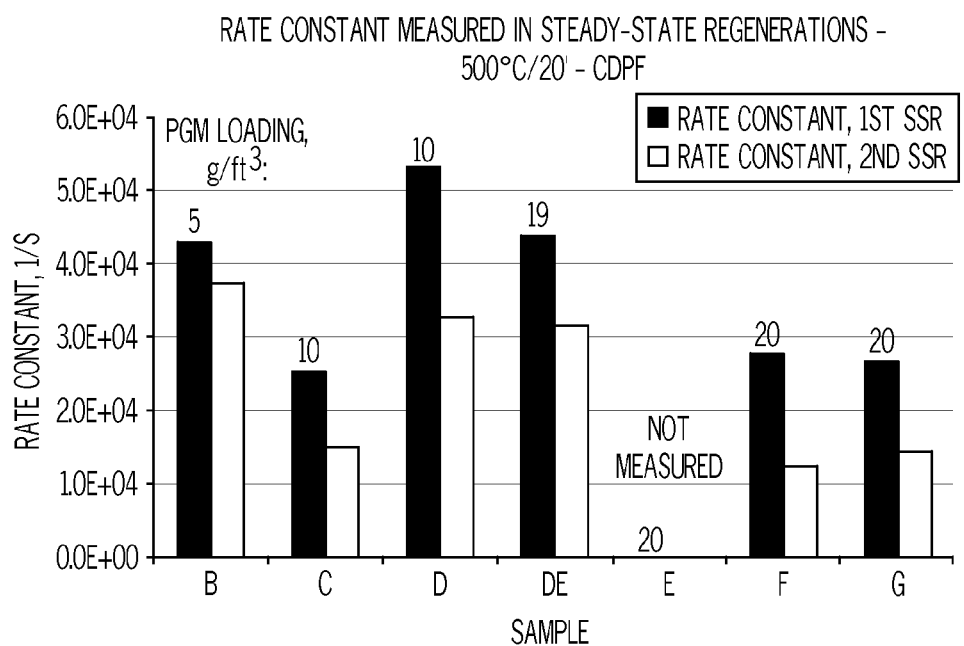
FIG. 4 is a graph illustrating the catalyst activities of reference CDPFs during soot combustion which were measured during steady-state regeneration.

FIG. 4 additionally illustrates the catalyst activities of reference CDPFs during soot combustion which were measured during steady-state regeneration (500° C. for 20 minutes) and evaluated as global rate constant k0 by applying following model:

1) ideally stirred isothermal reactor
2) Arrhenius dependence of the rate constant: $k(T) = k0 * T^{*(-Ea/T)}$
3) Reaction rate: $r(T) = k(T)*M^m*O^o$, where
r=reaction rate (g soot/L DPF/sec)
T=absolute temperature at DPF inlet, [K]
M=average soot loading, [g soot/L DPF]
m=kinetic order with respect to soot [–]
O=oxygen flux [g/s]
o=kinetic order for oxygen [–]
Ea=activation energy [K]
KO=pre-exponential factor=global rate constant It should be noted that a higher KO represents higher catalyst activity during soot combustion.

Dependence of average soot loading vs. time of the experiment was evaluated by:
1) initial soot loading measured by weighing;
2) final soot loading measured by weighing;
3) interpolating between initial and final soot loading using pressure drop normalized for exhaust gas volumetric flow rate and temperature.

k0 was calculated by fitting the above model to experimentally measured data, with k0 as the tuned parameter.

It should be noted that due to the lower temperature (500° C.), these steady-state regenerates were more $NO_2$ assisted regenerations in contrast to drop-to-idle regenerations (600° C.), where soot is basically burned by oxygen.

Figure 5:
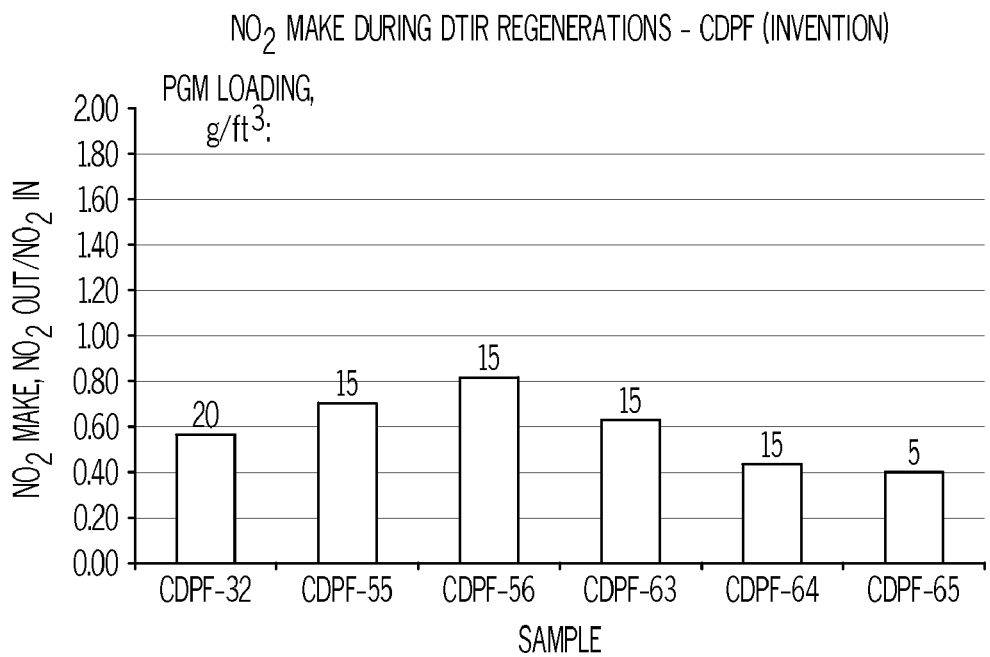
FIG. 5 is a graph illustrating NO$_2$ emissions during (DTIR) regeneration of catalyzed diesel particulate filter including a catalyst composition in accordance with the present invention.

The $NO_2$ emissions generated during regeneration of the CDPF samples of the present invention are illustrated in FIG. 5. As can be seen, for the CDPFs having a precious metal loading of 5 to 15 g/ft³, the average $NO_2$ make for the samples shown is 0.59, which is very close to the values observed for uncoated and fuel additive-assisted DPFs. Accordingly, use of the catalyst composition of the present invention results in a decrease in $NO_2$ over the DPF, i.e., the amount of $NO_2$ on the DPF outlet is 40% lower on average than the $NO_2$ amount entering the DPF during regeneration.

Also as shown in FIG. 5, the samples which contained additional cobalt or cobalt and iron oxides produced even lower levels of $NO_2$ emissions. Specifically, for samples 64 and 65 which contained Pd only or Pd—Pt (with very low Pt loading of 1 g/ft³), the value of $NO_2$ emissions was only 0.4, which is below the level of emissions achieved with non-catalyzed and fuel assisted DPF filters.

Figure 6:
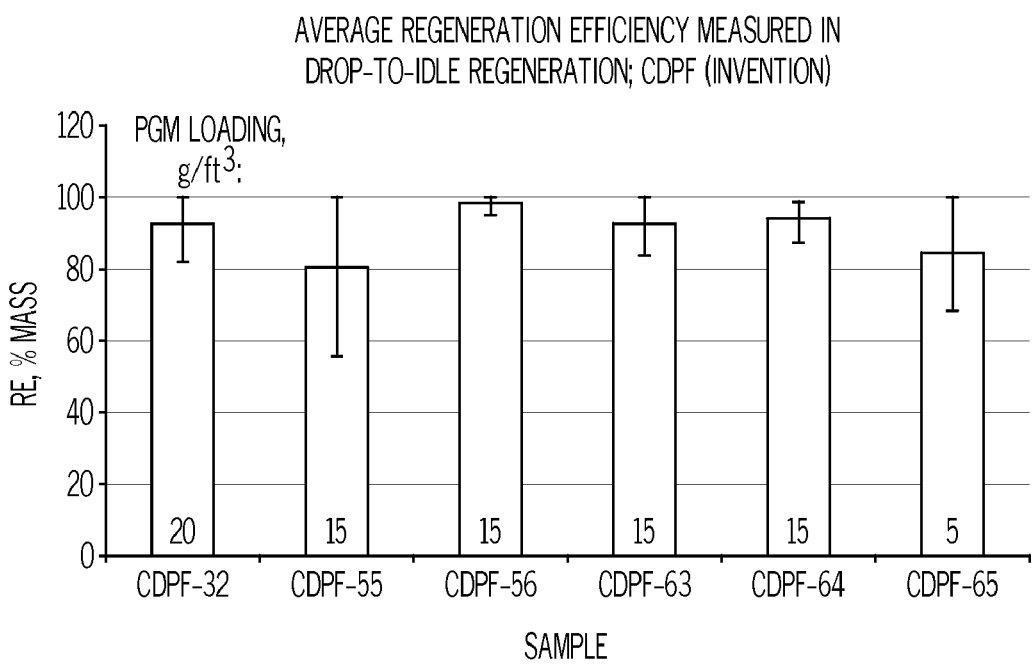
FIG. 6 is a graph illustrating average (DTIR) regeneration efficiency for the CDPFs of the present invention.

FIG. 6 illustrates the average (DTIR) regeneration efficiency for the CDPFs of the present invention. As can be seen, regeneration efficiencies were between 80 and 100% mass. High regeneration efficiencies were observed for Pd-based filters 64 and 65 having very low Pt (#64) and no Pt (#65). As platinum prices are typically more than 4 times higher than Pd, such Pd-based catalyst compositions are the most desirable due to their lower cost, high regeneration efficiency, and low $NO_2$ emissions during DPF regenerations.

Figure 7:
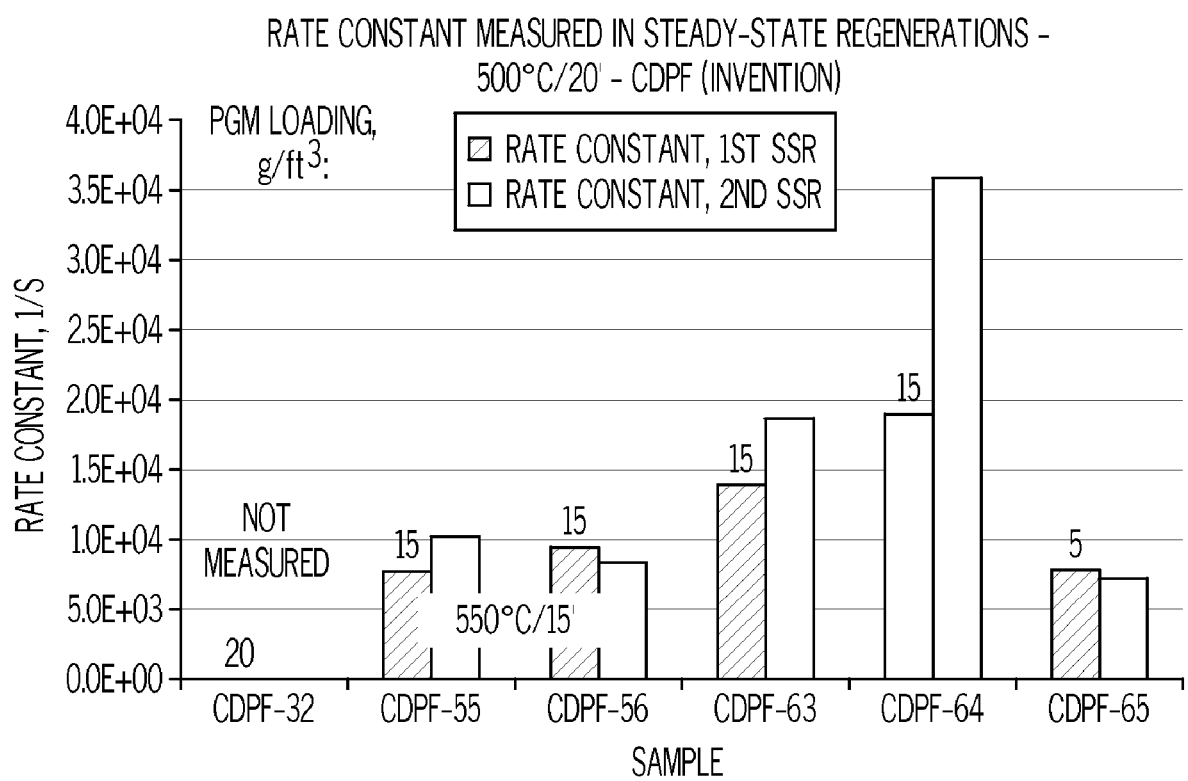
FIG. 7 is a graph illustrating the catalyst activities of CDPFs of the present invention in soot combustion under steady-state conditions.

FIG. 7 illustrates the catalyst activities of the CDPFs of the present invention in soot combustion under steady-state conditions (500° C. for 20 minutes), which were evaluated as Global rate constant k0. It was expected that for this $NO_2$ type of regeneration, the activity would be lower than for standard CDPFs due to the low activity in $NO_2$ formation. However, it was unexpectedly found that the activity of filters #63 and #64 after many regenerations was comparable with the majority of standard CDPFs. It was also noted that the activity of filters #63 and #64 improved after a series of regenerations when comparing the activity for fresh and aged samples in FIG. 7. This is indicative that such catalyst compositions exhibit high thermal stability.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A catalyst composition for use on a diesel particulate filter for facilitating soot oxidation comprising:
    a catalytic metal comprising a platinum group metal selected from the group consisting of Pt, Pd, Pt—Pd, and combinations thereof;
    an active metal oxide component comprising CuO—$La_2CuO_4$; and
    an oxide component selected from the group consisting of oxides of Co, Fe, and combinations thereof.

2. The catalyst composition of claim 1 wherein said platinum group metal loading is between about 5 to about 15 g/ft³.

3. The catalyst composition of claim 1 wherein said catalytic metal comprises palladium only.

4. The catalyst composition of claim 1 wherein said Co oxide component comprises $Co_3O_4$.

5. The catalyst composition of claim 1 wherein said Fe oxide component comprises $Fe_2O_3$.

6. The catalyst composition of claim 1 further including a support selected from the group consisting of alumina, silica, zirconia, and combinations thereof.

7. The catalyst composition of claim 6 wherein said support has been stabilized with an element selected from the group consisting of lanthanum, zirconium, aluminum, and combinations thereof.

8. The catalyst composition of claim 1 wherein said platinum group metal loading in said catalyst composition is less than about 20 g/ft³.

9. A diesel exhaust gas treatment system comprising:
    a diesel particulate filter for receiving diesel exhaust gas from a diesel engine; and
    a catalyst composition coated on said filter; said catalyst composition comprising a catalytic metal comprising a platinum group metal selected from the group consisting of Pt, Pd, Pt—Pd, and combinations thereof; an active metal oxide comprising CuO—$La_2CuO_4$; and an oxide component selected from Co, Fe, or combinations thereof.

10. The diesel exhaust gas treatment system of claim 9 wherein said platinum group metal loading in said catalyst composition is less than about 20 g/ft³.

11. The diesel exhaust treatment system of claim 9 wherein said platinum group metal loading is between about 5 and about 15 g/ft³.

12. The diesel exhaust treatment system of claim 9 wherein said catalyst composition further includes a support selected from the group consisting of alumina, silica and zirconia, and combinations thereof.

13. The diesel exhaust treatment system of claim 9 wherein catalyst composition facilitates oxidation of soot trapped on said filter at a temperature between about 550 and 600° C.

14. The diesel exhaust treatment system of claim 9 wherein said catalyst composition facilitates oxidation of 60 to 100% of soot trapped on said filter.

15. The diesel exhaust treatment system of claim 9 wherein during regeneration of said diesel particulate filter containing said catalyst composition, the amount of $NO_2$ is reduced to between about 0.40 to 0.70 from its initial level upstream of said filter.

16. The diesel exhaust treatment system of claim 15 wherein during regeneration of said diesel particulate filter containing said catalyst composition, the amount of $NO_2$ is reduced to about 0.60.

17. The diesel exhaust treatment system of claim 15 wherein during regeneration of said diesel particulate filter containing said catalyst composition, the amount of $NO_2$ is reduced to about 0.40.

* * * * *